United States Patent [19]
Haddock

[11] 3,937,294
[45] Feb. 10, 1976

[54] OPERATOR HAND CONTROL FOR INDUSTRIAL LIFT TRUCKS

[75] Inventor: Louis A. Haddock, Battle Creek, Mich.

[73] Assignee: Clark Equipment Company, Buchanan, Mich.

[22] Filed: Sept. 26, 1974

[21] Appl. No.: 509,583

[52] U.S. Cl.............. 180/77 R; 74/473 R; 74/523
[51] Int. Cl.² ........................................ B60K 26/02
[58] Field of Search......... 180/77 R; 74/473 R, 523; 200/61.85, 61.88, 157; 187/9 R, 8.45

[56] References Cited
UNITED STATES PATENTS

| | | | |
|---|---|---|---|
| 1,879,096 | 9/1932 | Cochran | 180/77 R |
| 2,495,993 | 1/1950 | Wallace | 180/77 R X |
| 3,098,543 | 7/1963 | Hastings | 187/9 R |
| 3,180,514 | 4/1965 | Horton | 200/157 X |
| 3,235,035 | 2/1966 | Weaver | 187/9 R |
| 3,774,468 | 11/1973 | Kimsey | 74/473 R |
| 3,811,336 | 5/1974 | Pulskamp | 74/471 XY |
| 3,823,616 | 7/1974 | Houseman | 200/157 X |

*Primary Examiner*—M. Henson Wood, Jr.
*Assistant Examiner*—Terrance L. Siemens
*Attorney, Agent, or Firm*—John C. Wiessler

[57] ABSTRACT

A single multi-function operator hand control for stand-up lift trucks located and designed for improved operator comfort and convenience and to reduce operator fatigue in any driving position. The hand control is recessed in a compartment adjacent one side of the truck and below the upper body thereof. It is mounted pivotally from one end and extends longitudinally towards the operator; it includes a rotatable control member at the opposite end so that the operator's forearm when in controlling positions is normally in or adjacent to the vertical plane of the control handle and the hand palm is located generally in a vertical plane and faces the control member which rotates on an axis transverse of the truck.

17 Claims, 18 Drawing Figures

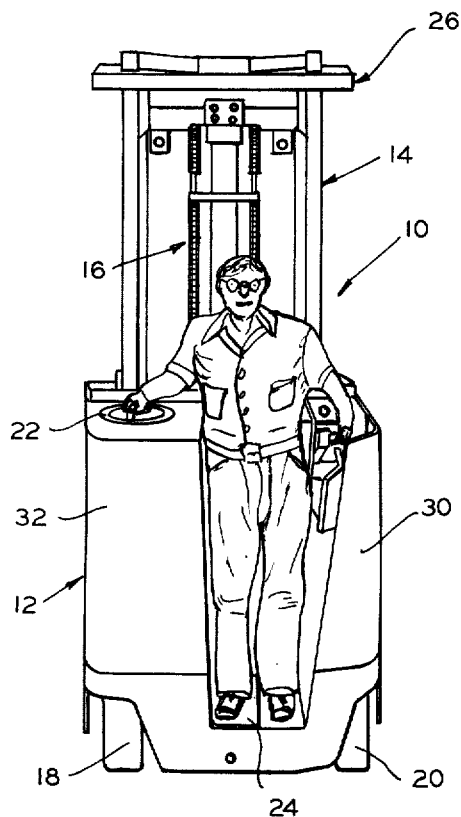
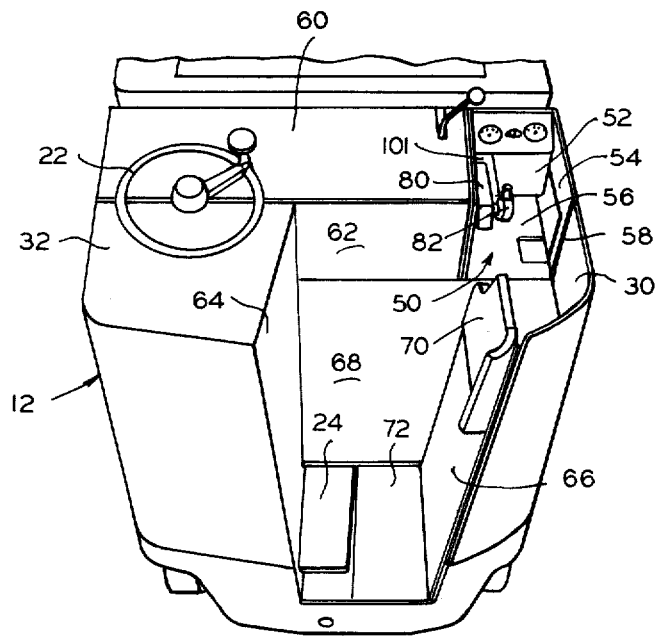
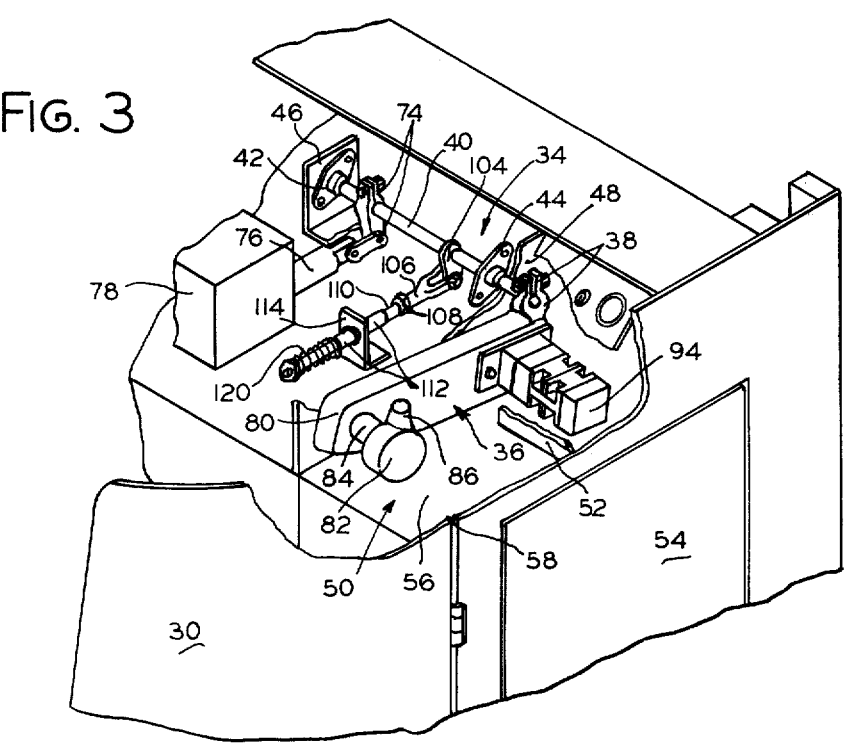

3,937,294

OPERATOR HAND CONTROL FOR INDUSTRIAL LIFT TRUCKS

BACKGROUND OF THE INVENTION

This invention relates to controls for industrial lift trucks, and more particularly to an operator's manual control.

The prior art includes various means which are intended to provide manual controls for reducing operator fatigue and single multi-function control assemblies for improving operator convenience. Exemplary of such prior art are U.S. Pat. Nos. 3,098,543 and 3,811,336.

SUMMARY OF THE INVENTION

The invention is concerned mainly with human engineering factors involved in the manual control of certain powered functions in the exemplary environment of a stand-up rider type industrial lift truck. The control is designed and located so that the functions to be controlled are sense oriented, operator fatigue tends to be minimized whether the operator is facing forwardly or rearwardly of the lift truck, and a natural support for the operator is provided during travel operations either forwardly or rearwardly. Also, in the preferred embodiment the control is located in a recessed compartment which provides both protection for the operator and the control, and aesthetic design.

It is a principal object of the invention to provide a manual control for stand-up lift trucks, and the like, which utilizes human engineering principles so as to minimize operator fatigue during operation of the truck in either direction.

Other objects, features and advantages of the invention will appear in the detailed description which follows when taken in conjunction with the accompanying drawings, wherein:

FIG. 1 is a perspective view taken from the rear of a stand-up lift truck showing an operator in position for driving the truck in a rearward direction;

FIG. 2 is an enlarged perspective view of the operator's compartment of the lift truck taken from an elevated rearward position;

FIG. 3 is a further enlarged partial cut-away view taken from an elevated right side position of a portion of the truck as shown in FIG. 2;

Figure 4:
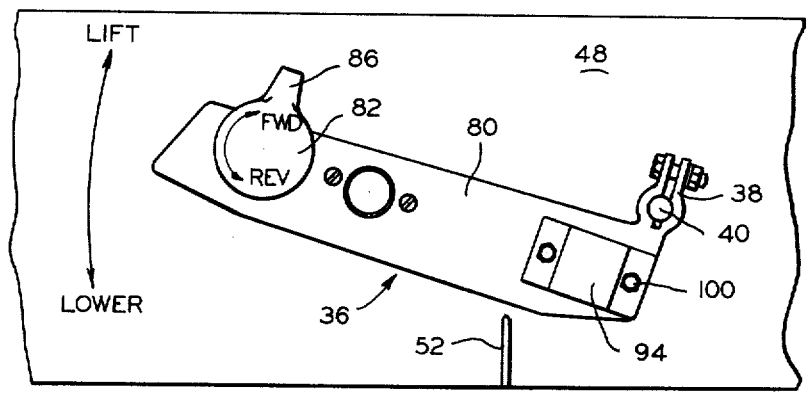
FIG. 4 is a side elevational view of the control in a normal inoperative or neutral position in relation to a panel mounting member of the truck.
Figure 5:
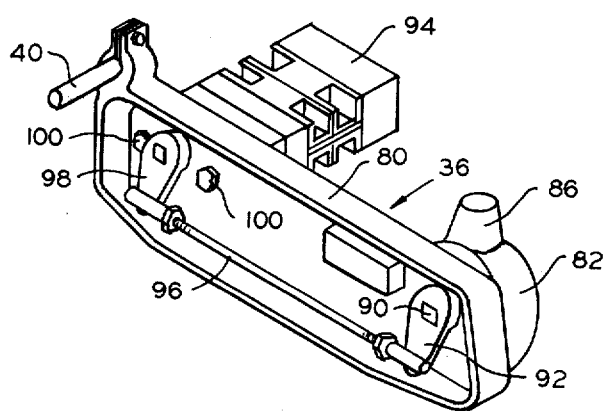
FIG. 5 is a left side perspective view of the manual control showing the interior thereof.
Figure 6:
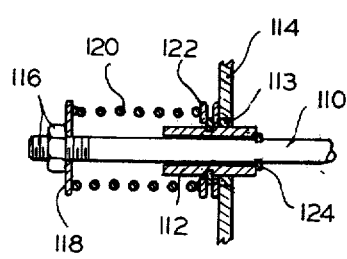
FIGS. 6, 7 and 8 are detailed views of a spring actuator assembly which is operatively connected to the manual control.

FIGS. 9-13 comprise a series of partial perspective views which show the operator's hand and arm in five basic typical positions in relation to the control when the operator is facing in a forward direction; and FIGS 14–18 comprise a series of partial perspective views which show the operator's hand and arm in five basic typical positions in relation to the control when the operator is facing in a rearward direction.

Referring now in detail to the drawing, a stand-up rider lift truck is shown generally at numeral 10. It utilizes, as is usual, a tractor unit 12 suitably coupled to a forward load carrying unit or U-shaped frame, not shown, in which is mounted a telescopic upright assembly 14 having a fork carriage mounted therein for elevation thereon by means of a hydraulic lift cylinder, chains and sprockets 16. Hydraulic, electrical, and drive, steering and control systems are housed in part interiorly of the body and frame of the tractor unit 12. These systems do not comprise a part of this invention and so have not been disclosed except certain parts of the lift and travel controls which are associated directly with the manual control of the invention as shown in FIGS. 3 and 5-7. Fork reach and tilt actuators and controls associated with a fork carriage, not shown, may also be embodied to provide such additional known functions. A single drive wheel 18 is connected by an articulated axle, not shown, to a dirigible idler wheel 20. An SCR control and contactor panels are located inside of a hinged swing-out body member 30. Drive, lift and steer motors and associated components and circuitry are located inside a hinged swing-out body panel 32, a single drive motor being mounted in driving connection to wheel 18.

Suitable steering and braking systems are preferably connected to both wheels 18 and 20 being operator controlled by a steer wheel 22 and a dead-man brake operated by a brake pedal 24 which releases the brake when the operator stands on the pedal and applies the brake when it is released. A preferred system for construction for driving, braking and steering the wheels 18 and 20 is disclosed and claimed in copending application Ser. No. 428,502, common assignee, now U.S. Pat. No. 3,848,692. An overhead guard is shown at 26 to provide overhead safety protection for the operator.

The manual controller of my invention is shown assembled in perspective view at numeral 34 in FIG. 3 inside the broken-away body panels, a handle assembly 36 thereof being secured by a bracket and bolt 38 to the one end of a control shaft 40 which is mounted from a pair of transversely spaced brackets and bearings 42 and 44 secured to fixed body members 46 and 48, respectively, the shaft 40 being mounted for rotational movement in either direction from a neutral position by actuation of handle assembly 36. The handle assembly extends longitudinally of the truck adjacent body plate 48 and is located in a recessed compartment 50 formed by a forward instrument panel 52, side plates 48 and 54, and bottom plate 56, body panel 30 being hinged at 58 from the rearward edge of plate 54. Linkage assemblies supported from shaft 40 are housed within a compartment which includes plate members 60 and 62 (FIG. 2). The operator's compartment is formed between downwardly converging plate members 64 and 66, a front plate 68, a contoured plate 70 secured to plate 66, and a floor plate 72 adjacent brake pedal 24.

With the operator in position to operate the truck either in a forward or reverse direction, control handle 36 is most conveniently located in recessed compartment 50 for control by the operator's right or left hand, respectively. The control handle assembly 36 is actuated in a clockwise direction with shaft 40, as seen in FIG. 4, to actuate by means of a lever and link 74, a lift valve 76 of a hydraulic valve assembly 78 for energizing the lift cylinder assembly 16 to elevate the upright and fork carriage thereon; it is actuated in a counter-clockwise direction with shaft 40 to lower the upright and carriage.

Mounted for rotational movement in either direction from one end of a control handle portion 80 is a generally disc shaped speed control knob 82 mounted from the end of a tranversely projecting member 84 which is secured to control handle 80, the control knob 82 being of substantial thickness and having a projecting member 86 at the upper end thereof. A square shaft 90 connects control knob 82 to a lever 92 internal of handle 80 (FIG. 5) which in turn is connected to a control assembly 94 of the SCR control by a link 96 and a lever 98, both interior of handle 80, the link being connected to levers 92 and 98 by ball joints. Control assembly 94 is secured to the one end portion of the control handle by a pair of bolts 100 and is in turn operatively connected by means, not shown, to the SCR speed control interior of panel 30. The mounting of the control handle is such that the forward end portion thereof, including speed control portion 94, is located inside of the instrument panel behind plate 32, panel 52 extending only partially across the recessed compartment 50 so as to provide a space 101 in which the handle 80 can move up and down as it pivots on control shaft 40.

The control assembly 36 is maintained normally in a neutral or non-actuated position as best shown in FIG. 4, in which position the assembly 36 assumes a predetermined "at rest" angle relative to the horizontal by the action of a spring and linkage assembly as shown in FIGS. 3 and 6–8 in conjunction with a valve return spring, not shown, of valve assembly 78. The spring and linkage assembly comprises a lever 104 secured to shaft 40 and pivotally connected to actuate a bifurcated link 106 which is adjustably connected by a nut 108 to a pin 110 which extends slidably through a sleeve 112 which in turn is mounted in a bearing 113 in an opening in an angle bracket 114 connected to the truck body. At the left end a threaded retainer plate 118 may be adjustably located by a threaded nut 116 on pin 110. Plate 116 supports one end of a compression spring 120 which extends axially of pin 110 and is supported at the opposite end by an annular U-shaped bracket 122 retained by a snap-ring on sleeve 112 as shown. A snap-ring 124 is located in a predetermined position on pin 110.

Figure 7:
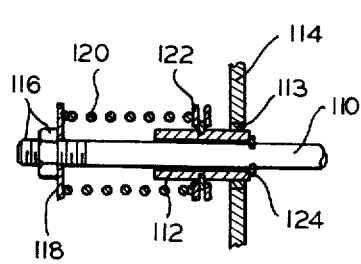
Figure 8:
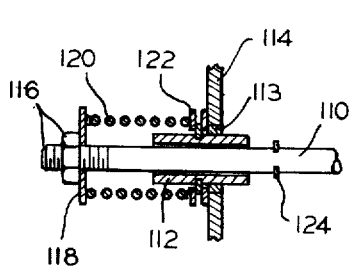

With the spring 120 in a non-actuated condition it is preloaded in compression by the gravity forces acting on it resulting from the weight of control handle assembly 36 and parts mounted therefrom, all exerting a force on the spring through shaft 40 and the linkage assembly connected thereto which terminates in retainer plate 118. In such condition the control handle assembly is preferably oriented in the compartment 50 as best shown in FIG. 4. Actuation of handle 80 in the direction indicated to lift the upright assembly by means of control valve 78 actuates pin 110 and snap-ring 124 leftwardly to actuate the sleeve and spring assembly as a unit as shown in FIG. 7 with no change in spring action. Actuation in the opposite direction to lower the upright assembly actuates the pin and retainer to compress the spring as shown in FIG. 8 which desirably increases the operator feel or effort required to push down handle 80 in conjunction with the action of the valve return spring of valve assembly 78.

Figure 9:
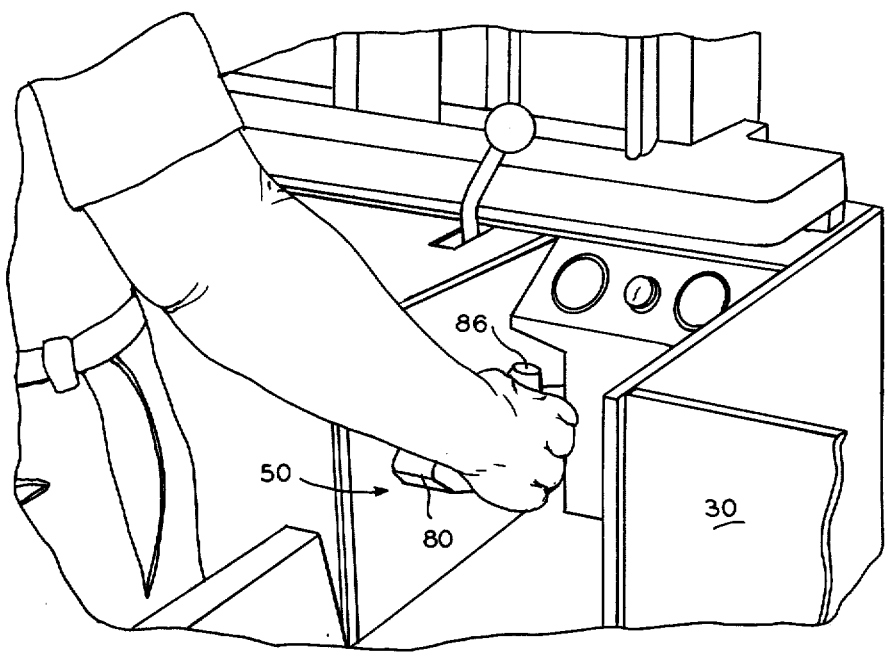
Figure 10:
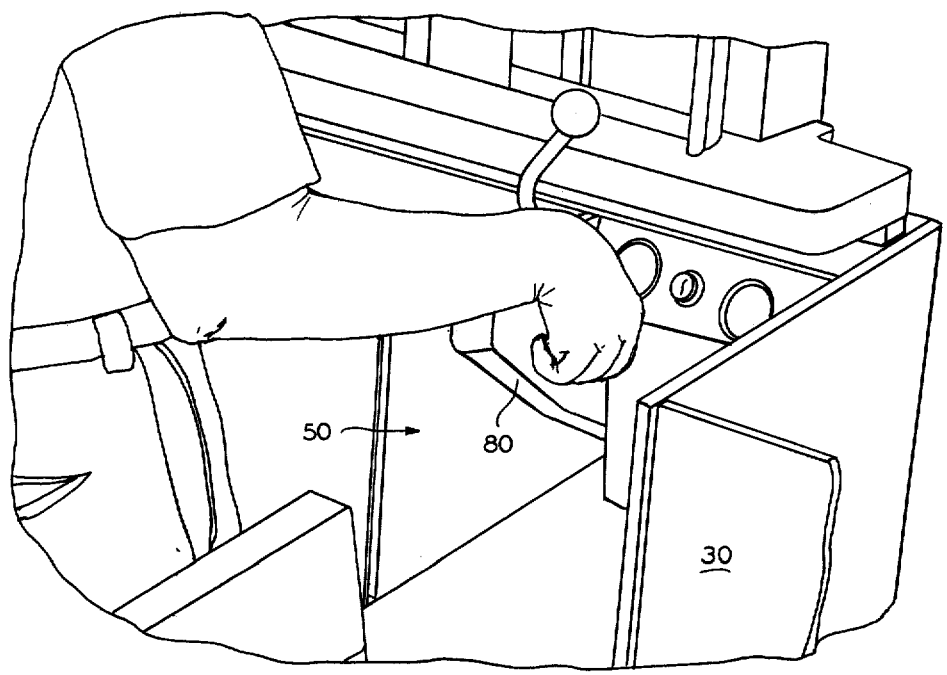

The operational and human engineering factors involved in my invention are best illustrated by referring to FIGS. 9–18. FIGS. 9–13 show five typical and basic operating positions when driving while facing forwardly of the truck in FIG. 9 the control handle assembly is located in a neutral and nonactuated position with the operator's hand and arm being located typically in relation thereto (as it is also in FIGS. 10–18) for an operator of about average height. In FIG. 10 the control handle 80 is actuated upwardly to elevate the upright without initiating travel in either direction of the truck; in FIG. 11 it is actuated downwardly to lower the upright with control knob 82 in neutral position; in FIG. 12 handle 80 is in a neutral position while control knob 82 is actuated for a full travel speed forward; and in FIG. 13 handle 80 is in a neutral position with the control knob actuated for full speed in reverse.

This type of control is generally known as directional control, which tends to make such controls instinctive on the part of the operator. The degree of such forward or rearward rotation of knob 82 determines the speed in forward or reverse, respectively, at which the truck will operate.

Of course, the hand and arm position of the operator will vary somewhat depending on personal preference and the height of the operator, but a typically comfortable and relatively fatigue free position is shown in each of these figures. Of course, any combination of lift or lower and forward or reverse speed control may be effected at the operator's option, FIGS. 9–13 illustrating the five basic operating conditions noted.

Figure 11:
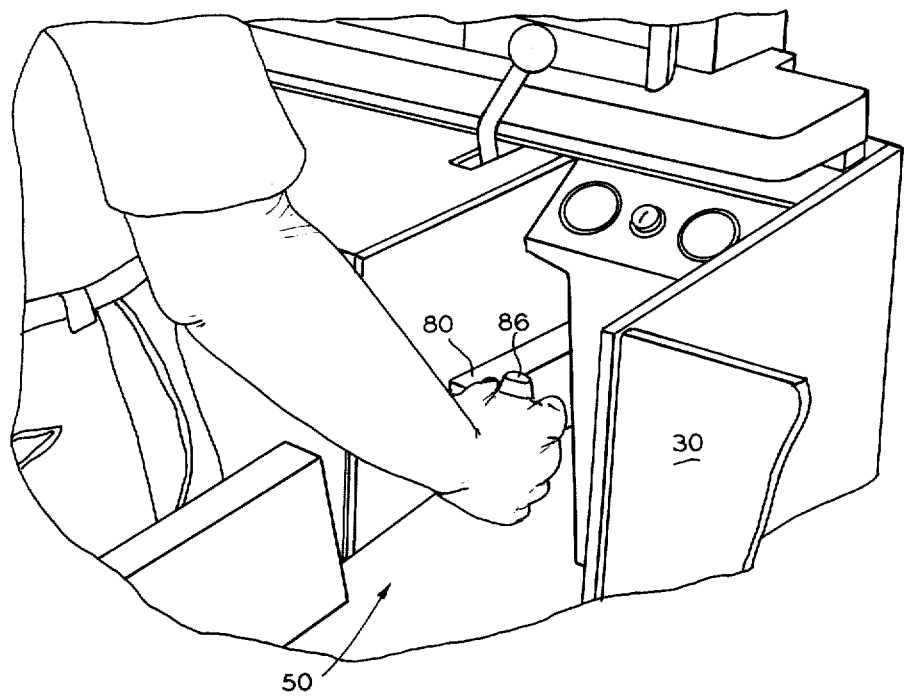
Figure 12:
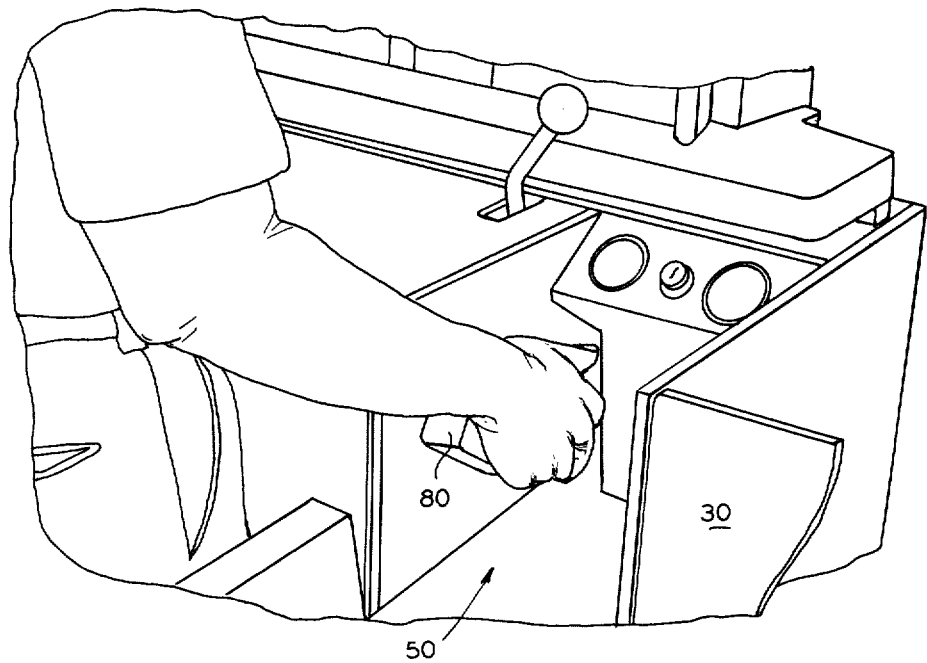
Figure 13:
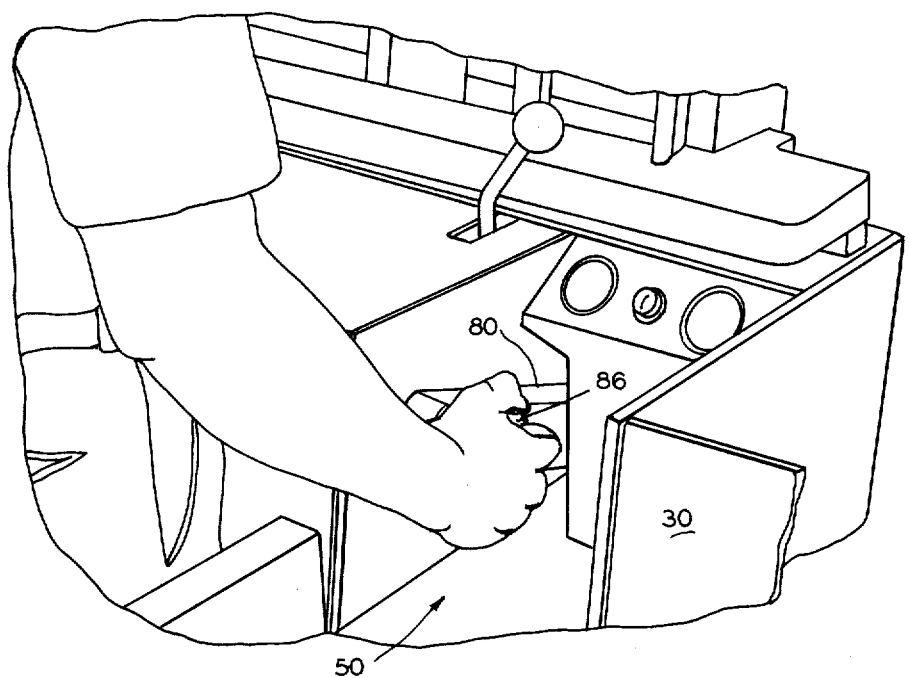
Figure 14:
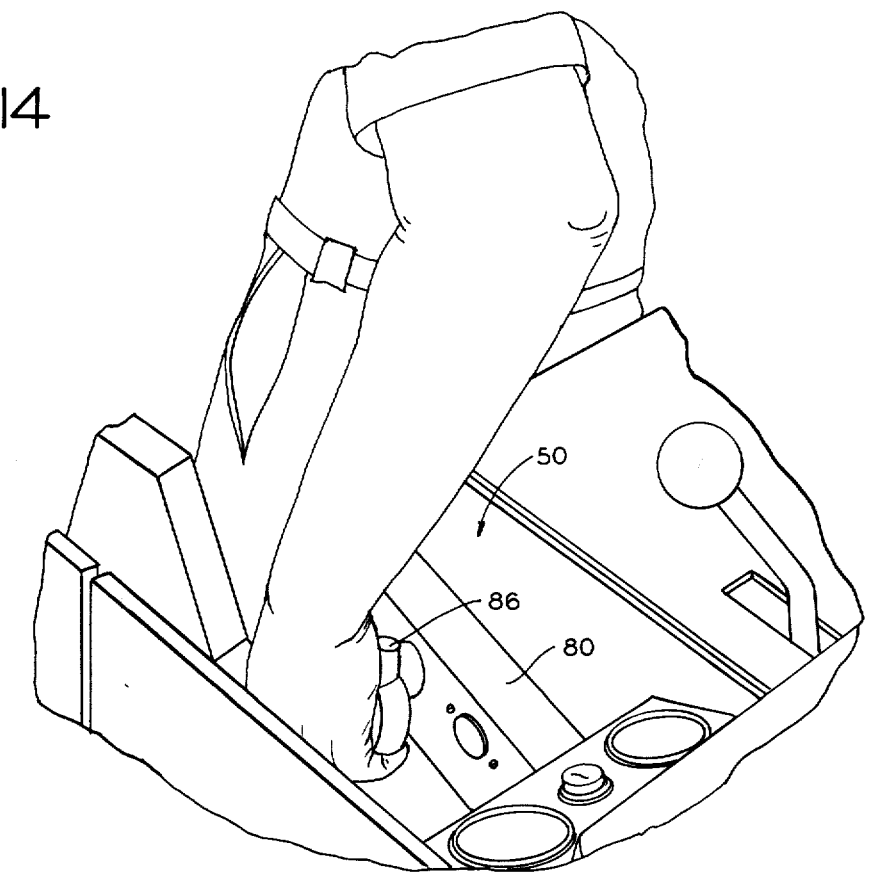
Figure 15:
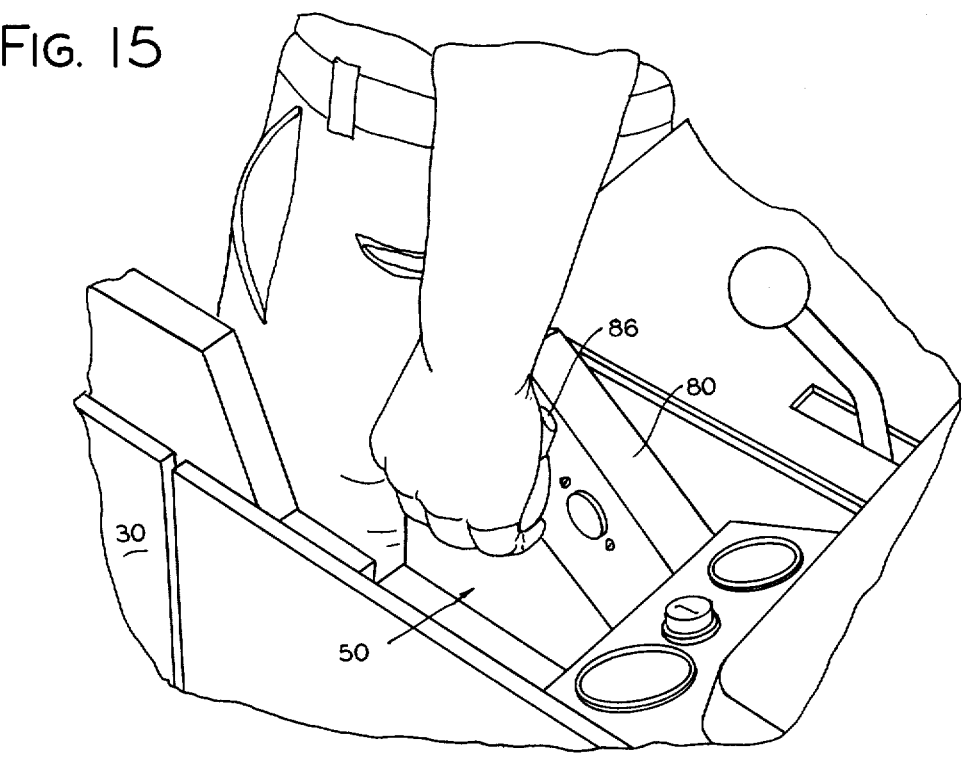
Figure 16:
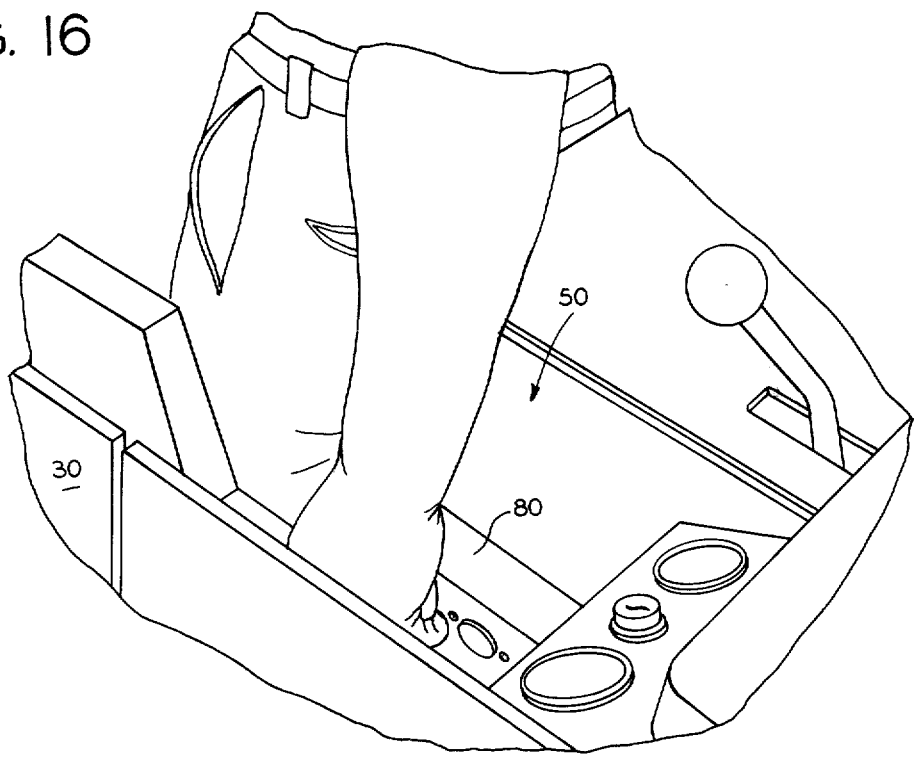

With the operator facing forwardly the right hand normally fully grasps control knob 82 in the neutral position of FIG. 9 with projection 86 located in the crotch between the thumb and index finger and the fingers wrapped around the front portion of the knob, all motions in lift, lower and travel from that basic position being effected by the normal wrist and arm actions as illustrated in the four other positions of FIGS. 10–13. In FIG. 10 the normal wrist and forearm action shown to lift handle 80 tends to shift the band so that the fingers wrap around the lower portion of the knob and projection 86 remains in the crotch of the hand. The downward motion as shown in FIG. 11 effects little if any change in hand position from FIG. 9, the wrist action shown being the primary movement. It has been found to be convenient and preferred when forward travel is desired to use the thumb on projection 86 to help rotate knob 82, as shown in FIG. 12. In FIG. 13 rotation of the knob for reverse travel preferably is accomplished by hooking the thumb over projection 86, which also involves minor wrist action as shown.

In FIGS. 14–18 the same five basic positions are illustrated in the same order as defined above with respect to FIGS. 9–13, but with the operator facing rearwardly of the truck for primary travel in a reverse direction. Thus, the left hand is located to control travel direction and speed, and upright elevation. It should be noted that the other hand in all cases is located on steer wheel 22 as shown in FIG. 1. Again, it will be apparent that the typical hand and arm positions illustrated for operating the truck as described above show a relatively comfortable and relaxed orientation of the human elements and limb involved to the truck control elements as shown in FIGS. 1 and 9–18. In FIGS. 14–18 the normal relative positions of the human and machine elements are well illustrated and need not be described in any detail. The knob 82 tends to be palmed in all of these figures with difference as between FIGS. 15 and 16 being mainly that finger pressure on the bottom of the control knob is applied in FIG. 15 for lifting handle 80 and palm pressure on the knob and projection 86 is applied in FIG. 16 to lower the handle. Of course, a somewhat different angulation between the forearm and upper arm exists as between FIGS. 14, 15 and 16, as shown.

Figure 17:
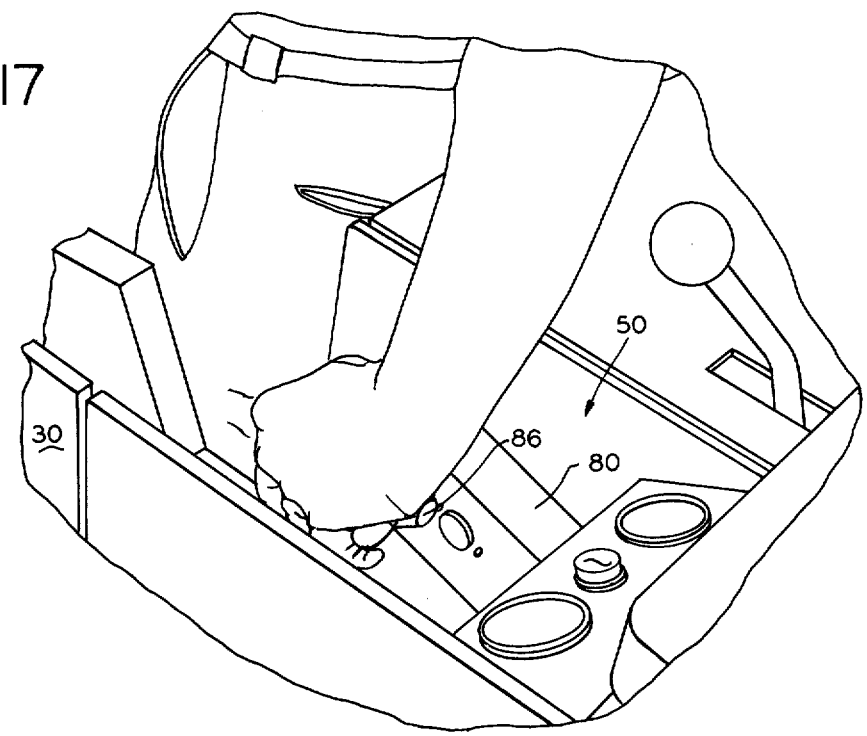
Figure 18:
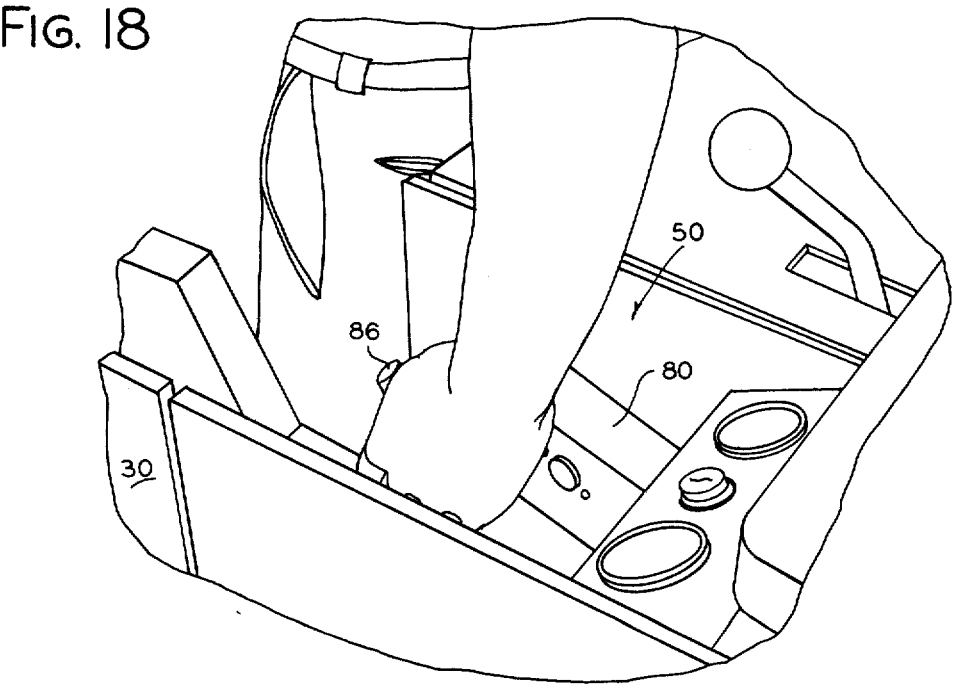

In FIG. 17 in full travel forward the heel of the hand is applying pressure to the projection to rotate the knob, while in FIG. 18 it is usually found convenient to grasp projection 86 in the crotch of the hand, as shown, and rotate the knob for full travel in reverse. It will be appreciated from observation of the various hand and arm locations and movements in FIGS. 9–18 that in none of the positions illustrated is any unduly tiring hand, wrist or arm action required to control the trunk functions involved for the time periods normally required, and the same is true in respect of various combinations of travel speed and lift or lowering operations. Of course, the hand may be shifted to any most comfortable position in any travel speed condition, for example, depending upon operator preference, particularly if the condition is to be maintained for a relatively long period of time.

Human engineering factors have been carefully designed into my control assembly. For example, in addition to the foregoing, the neutral position of the control assembly, as best shown in FIG. 4, has been carefully designed to provide during operation of the truck from a forwardly facing position an operator support means in fore and aft directions. For persons of about average height and proportions the normal preloaded angle at which the control handle 80 is maintained is approximately aligned longitudinally with the forearm of the operator in order to provide fore and aft support for the operator during truck movements, while minimizing any tendency for unintended forces to be applied by the operator which tend to lift or lower the upright. Since one hand of the operator will be almost continuously located on the control handle during operation of the truck, it is beneficial to his safety and convenience to incorporate such stabilizing means in the assembly. Also, the entire control assembly is located in recess 50 which provides not only protection for the operator's hand and wrist, but allows the control assembly to be located in such types of lift trucks in a more comfortable position than heretofore. In addition, the recesses design has aesthetic value which reduces the clutter normally seen atop the upper body panels of such trucks.

It will be appreciated that the recessed location at the side of the truck with available hand and arm control movements to operate the control assembly provide a particularly advantageous environment when the driver is facing to the rear as in FIGS. 14–18. Heretofore such controls have tended to be relatively awkward to operate when the operator is so located. When it is considered that the control assembly may be operated hundreds of times per day, the importance of minimizing fatigue factors and the energy output required of the operator will be appreciated. A very important aspect of the invention is the design for establishing a relationship which places the forearm of the operator in many of the operating positions generally in or adjacent to vertical plane of the control handle 80. Also, that the palm of the hand of the operator in many of the operating positions faces in a general way said vertical plane. Stated in other words it may be said that the forearm tends to hand forwardly or rearwardly of the operator's body, and that the axis of the hand is generally transverse to the truck in most control positions. These unique relationships result in the human factor advantages discussed above.

It will be apparent to those skilled in the art that various changes in the structure and relative arrangement of parts may be made without necessarily departing from the scope of my invention as defined in the claims appended.

I claim:

1. In an industrial truck having an operator's station of the stand-up type formed in a body portion of the truck, an operator's control handle mounted pivotally from its one end portion and extending from its said one end portion longitudinally of the truck, a rotatable operator's control member connected to one side of the end of the control handle which is remote from said pivoted end portion, said control member being rotatable in a plane substantially parallel to the vertical plane of the control handle on an axis substantially transverse of the truck, the operator's forearm being in a plurality of operator control positions in relation to the control handle functionally in or adjacent the vertical plane thereof, and the operator's hand palm being located generally in a vertical plane in facing relation to the control member.

2. An industrial truck as claimed in claim 1 wherein a compartment is located at one side of the truck recessed below the upper truck body, said operator control handle being located in said compartment.

3. An industrial truck as claimed in claim 1 wherein said control handle is normally pulled and pushed upwardly and downwardly, respectively, by an operator facing longitudinally in one direction of the truck to control certain operating functions thereof, and said control member is rotatable on its axis while palmed by the operator for controlling other truck functions.

4. An industrial truck as claimed in claim 1 wherein said control member comprises knob means having a projection extending outwardly from the periphery thereof for location in the crotch of the operator's hand in certain control positions.

5. An industrial truck as claimed in claim 1 wherein said control handle extends also diagonally upwardly of the truck and towards the operator.

6. An industrial truck as claimed in claim 5 wherein said control handle in a neutral control position extends at such an angle to afford fore and aft support for the operator.

7. An industrial truck as claimed in claim 6 wherein a compartment is located at one side of the truck recessed below the upper truck body, said control handle being mounted in said compartment such that during operation the operator's hand is protected inside of the compartment which also facilitates comfortable operator control posture.

8. An industrial truck as claimed in claim 6 wherein operator support is effected in part by generally axially longitudinal alignment of the operator's forearm and the control handle.

9. In a control system for an industrial truck having a body portion located rearwardly thereof, a lift assembly mounted forwardly of the body portion and an operator's station formed in said body portion for permitting an operator to stand at the rear of the truck while bodily turned to face either forwardly or rearwardly thereof, an operator's control handle mounted at one side of the operator's station pivotally from one end portion of the control handle and extending therefrom longitudinally of the truck, a rotatable operator's control member connected to one side of the end of the control handle which is remote from said pivoted end portion, said control member being rotatable in a plane substantially parallel to the vertical plane of the control handle on an axis substantially transverse of the truck, the control handle being so disposed that in a plurality of normal control positions wherein the operator may be bodily turned to face either forwardly or rearwardly of the truck the operator's forearm approaches generally a location in or adjacent to the vertical plane of the control handle, and the operator's hand palm is located generally in a vertical plane in facing relation to the control member.

10. An industrial truck as claimed in claim 9 wherein said control handle is pivoted upwardly to elevate the lift assembly and downwardly to lower it, and said control member is rotated in one direction or the other to control travel and speed of the truck in one direction or the other.

11. An industrial truck as claimed in claim 9 wherein a compartment is located at one side of the truck recessed below the upper truck body, said control handle being located in said compartment and extending diagonally upwardly and rearwardly from the pivoted end portion thereof in neutral position.

12. An industrial truck as claimed in claim 9 wherein the operator's forearm extends diagonally downwardly and forwardly of the truck in certain control positions when the operator is bodily turned to face forwardly of the truck.

13. In an industrial truck having an operator's station of the stand-up type formed in a body portion of the truck, a compartment located at one side of the truck recessed below the upper truck body, an operator's control handle mounted in said compartment pivotally from its one end portion and extending from its said one end portion longitudinally and diagonally upwardly of the truck towards the operator's station, and a rotatable operator's control member connected to and spaced from the one side of the end of the control handle which is remote from said pivoted end portion, said control member being rotatable in a plane substantially parallel to the vertical plane of the control handle about an axis substantially transverse of the truck and adapted to be palmed by the hand of an operator during operation of the truck such that the hand palm is located in a generally vertical plane.

14. An industrial truck as claimed in claim 13 wherein said control member is of a generally disc shaped configuration.

15. An industrial truck as claimed in claim 14 wherein said control member has a projection extending outwardly from the periphery thereof for location in the crotch of the operator's hand in certain control positions.

16. An industrial truck as claimed in claim 13 wherein the operator's forearm extends diagonally downwardly and forwardly of the truck in certain control positions when the operator faces forwardly of the truck.

17. An industrial truck as claimed in claim 16 wherein said operator's forearm approaches a vertical position in certain control positions when the operator is facing rearwardly of the truck.

* * * * *